(12) United States Patent
Igarashi et al.

(10) Patent No.: US 12,199,664 B2
(45) Date of Patent: Jan. 14, 2025

(54) LIGHT LEAKAGE CONFIRMATION METHOD, LIGHT LEAKAGE CONFIRMATION APPARATUS AND PROGRAM

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP); Takuya Kanai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 32 days.

(21) Appl. No.: 17/924,149

(22) PCT Filed: May 28, 2020

(86) PCT No.: PCT/JP2020/021144
§ 371 (c)(1),
(2) Date: Nov. 9, 2022

(87) PCT Pub. No.: WO2021/240731
PCT Pub. Date: Dec. 2, 2021

(65) Prior Publication Data
US 2023/0188208 A1 Jun. 15, 2023

(51) Int. Cl.
*H04B 10/07* (2013.01)
*H04B 10/071* (2013.01)
(Continued)

(52) U.S. Cl.
CPC .......... *H04B 10/071* (2013.01); *H04B 10/07* (2013.01); *H04B 10/0771* (2013.01);
(Continued)

(58) Field of Classification Search
CPC .. H04B 10/071; H04B 10/07; H04B 10/0771; H04B 10/0777; H04B 10/29;
(Continued)

(56) References Cited

U.S. PATENT DOCUMENTS 5,136,420 A 8/1992 Inagaki et al.
5,138,483 A * 8/1992 Grasso .............. H01S 3/094003
372/71
(Continued)

FOREIGN PATENT DOCUMENTS

EP 0426221 A1 5/1991
JP H03-025985 A 2/1991
(Continued)

OTHER PUBLICATIONS

R. Igarashi et al., "Raman Amplification Based 40 km Reach 10G-EPON for Consolidation on the Central Office Building", OECC2019, TuA3-3, 2019.
(Continued)

*Primary Examiner* — Dibson J Sanchez

(57) ABSTRACT

A light leakage confirmation method comprising: an excitation light incident step in which an excitation light output unit connected to a first end of a first optical transmission line outputs an excitation light and makes the excitation light incident on the first optical transmission line; a reflection step in which an excitation light reflection unit connected to a second end of the first optical transmission line reflects the excitation light which has been incident in the excitation light incident step; a reflected light incident step of making a reflected light which has been reflected in the reflection step incident on the first optical transmission line; a reflected light measurement step in which the excitation light output unit measures an intensity of the reflected light; and a leakage determination step of determining whether or not the excitation light is leaked on a basis of the intensity of the
(Continued)

excitation light and the intensity of the reflected light which has been measured in the reflected light measurement step.

13 Claims, 8 Drawing Sheets

(51) Int. Cl.
| | |
|---|---|
| *H04B 10/077* | (2013.01) |
| *H04B 10/29* | (2013.01) |
| *H04B 10/291* | (2013.01) |
| *H04B 10/50* | (2013.01) |
| *H04B 10/564* | (2013.01) |

(52) U.S. Cl.
CPC .......... *H04B 10/0777* (2013.01); *H04B 10/29* (2013.01); *H04B 10/2916* (2013.01); *H04B 10/50* (2013.01); *H04B 10/564* (2013.01)

(58) Field of Classification Search
CPC .. H04B 10/2916; H04B 10/50; H04B 10/564; H04J 14/0282
USPC .......... 398/9–38, 173–181, 182–201
See application file for complete search history.

(56) References Cited

U.S. PATENT DOCUMENTS

| | | | | |
|---|---|---|---|---|
| 5,177,354 A * | 1/1993 | Tomita | ............... | G02B 6/4246 |
| | | | | 356/73.1 |
| 5,251,001 A * | 10/1993 | Dave | ............... | G01M 11/3109 |
| | | | | 356/73.1 |
| 5,966,480 A * | 10/1999 | LeGrange | .......... | H04B 10/2916 |
| | | | | 359/333 |
| 6,305,851 B1 * | 10/2001 | Stummer | ............. | H04B 10/071 |
| | | | | 385/24 |
| 6,342,965 B1 | 1/2002 | Kinoshita | | |
| 6,353,499 B2 * | 3/2002 | Zanoni | ............. | H01S 3/094003 |
| | | | | 359/341.32 |
| 6,417,961 B1 * | 7/2002 | Sun | ........................ | H01S 3/302 |
| | | | | 359/334 |
| 6,501,592 B2 * | 12/2002 | Terahara | .......... | H01S 3/094003 |
| | | | | 398/160 |
| 6,547,453 B1 | 4/2003 | Stummer et al. | | |
| 6,807,001 B1 * | 10/2004 | Ranka | .................... | H04B 10/07 |
| | | | | 359/334 |
| 7,031,049 B2 * | 4/2006 | Kamada | .............. | H01S 3/13013 |
| | | | | 359/341.44 |
| 7,206,123 B2 * | 4/2007 | Emori | ................ | H04B 10/2916 |
| | | | | 359/334 |
| 9,831,953 B2 * | 11/2017 | Imanishi | ............ | H04B 10/2916 |
| 2002/0181078 A1 * | 12/2002 | Tanaka | .................. | H01S 3/2375 |
| | | | | 359/334 |
| 2003/0142389 A1 * | 7/2003 | Gray | ........................ | H01S 3/302 |
| | | | | 359/334 |
| 2003/0234973 A1 | 12/2003 | Yamaguchi et al. | | |
| 2004/0201882 A1 * | 10/2004 | Kikuchi | ............. | H04B 10/2916 |
| | | | | 359/341.43 |
| 2005/0286898 A1 | 12/2005 | Okuno | | |
| 2006/0119931 A1 * | 6/2006 | Ghera | ..................... | H01S 3/302 |
| | | | | 257/E31.097 |
| 2007/0103766 A1 * | 5/2007 | Frriedrich | .......... | H04B 10/0777 |
| | | | | 359/341.1 |
| 2007/0154215 A1 * | 7/2007 | Zuhdi | .................. | H04B 10/071 |
| | | | | 398/67 |
| 2007/0177874 A1 | 8/2007 | Kashima et al. | | |
| 2007/0264012 A1 * | 11/2007 | Healey | ................ | H04B 10/079 |
| | | | | 398/13 |
| 2010/0260212 A1 * | 10/2010 | Mimuro | ................ | H01S 3/1312 |
| | | | | 372/6 |
| 2012/0224168 A1 * | 9/2012 | Hirai | ................... | H04B 10/0791 |
| | | | | 356/73.1 |
| 2012/0328304 A1 * | 12/2012 | Ikushima | ........... | H04B 10/2589 |
| | | | | 398/140 |
| 2013/0038865 A1 * | 2/2013 | McClean | ........... | G01M 11/3154 |
| | | | | 356/73.1 |
| 2014/0055777 A1 * | 2/2014 | Archambault | ...... | H01S 3/06754 |
| | | | | 356/73.1 |
| 2014/0077971 A1 * | 3/2014 | Archambault | .......... | H01S 3/302 |
| | | | | 340/870.04 |
| 2017/0279523 A1 * | 9/2017 | Parkin | ................ | H04B 10/0773 |
| 2021/0173149 A1 * | 6/2021 | Christopher | ......... | G02B 6/3895 |
| 2021/0288744 A1 * | 9/2021 | Fu | ....................... | H04J 14/0221 |

FOREIGN PATENT DOCUMENTS

| | | |
|---|---|---|
| JP | H03-166782 A | 7/1991 |
| JP | H09-179152 A | 7/1997 |
| JP | H11-215171 A | 8/1999 |
| JP | 200160921 A | 3/2001 |
| JP | 2003-298527 A | 10/2003 |
| JP | 2004-125711 A | 4/2004 |
| JP | 2006-013676 A | 1/2006 |
| JP | 2007208747 A | 8/2007 |
| JP | 2011147024 A | 7/2011 |

OTHER PUBLICATIONS

Derek Nesset et al., "Raman Extended GPON using 1240 nm Semiconductor Quantum-Dot Lasers", 2010 Conference on Optical Fiber Communication (OFC/NFOEC), OThW6, 2010.

Derek Nesset et al., "Bidirectional, Raman Extended GPON with 50 km Reach and 1:64 Split Using Wavelength Stabilised Pumps", 37th European Conference and Exhibition on Optical Communication, Th.12.C.1, 2011.

Mark D. Feuer et al., "Backreflection and Loss in Single-Fiber Loopback Networks", IEEE Photonics Technology Letters, vol. 12, No. 8, pp. 1106-1108, 2000.

Hiroshi Takahashi et al., "Impact of Crosstalk in an Arrayed-Waveguide Multiplexer on N x N Optical Interconnection", IEEE, Journal of Lightwave Technology, vol. 14, No. 6, pp. 1097-1105, 1996.

* cited by examiner

LIGHT LEAKAGE CONFIRMATION METHOD, LIGHT LEAKAGE CONFIRMATION APPARATUS AND PROGRAM

CROSS-REFERENCE TO RELATED APPLICATIONS

This application is a 371 U.S. National Phase of International Application No. PCT/JP2020/021144, filed on May 28, 2020. The entire disclosure of the above application is incorporated herein by reference.

TECHNICAL FIELD

The present disclosure relates to a light leakage confirmation method, a light leakage confirmation apparatus and a program.

BACKGROUND ART

Passive optical network (PON) systems are widely used in optical communication systems. FIG. 8 is a diagram illustrating a configuration example of an optical communication system 90 into which a PON system is adopted.
The optical communication system 90 has a system configuration in which a transmission/reception device disposed in a station building 910 and a transmission/reception device of each of a plurality of subscribers are coupled to each other by one optical transmission line 950 via an optical splitter 940. For example, the transmission/reception device disposed in the station building is an optical line terminal (OLT) 911, and the transmission/reception device of each subscriber is an optical network unit (ONU) 930. The OLT 911 and the ONU 930 transmit and receive signals via the optical transmission line 950 and the optical splitter 940. The signal from the OLT 911 to the ONU 930 is a downlink signal and the signal from the ONU 930 to the OLT 911 is an uplink signal.

The optical communication system has a disadvantage that an optical transmission line loss is increased by extending the optical transmission line. In addition, it will be difficult to secure workers for maintenance of the system in the future. Thus, a technique for compensating for an optical transmission line loss is required without installation of a new station building.

One method for solving this problem is a technique using distributed Raman amplification (NPL 1). FIG. 9 is a diagram illustrating a configuration example of an optical communication system 90 using distributed Raman amplification. In FIG. 9, the same components as those of the optical communication system 90 illustrated in FIG. 8 are denoted by the same reference signs.
The OLT 911 and the ONU 930 transmit and receive signals via a wavelength multiplexer/demultiplexer 913, an OLT optical transmission line 951, a wavelength multiplexer/demultiplexer 960, an ONU optical transmission line 952, and an optical splitter 940. An excitation light output unit 912 is disposed in the station building 910. The wavelength multiplexer/demultiplexer 913 makes the excitation light output from the excitation light output unit 912 incident on the OLT optical transmission line 951. As a result, backward excitation occurs in the OLT optical transmission line 951, and the uplink signal is subjected to distributed Raman amplification.
The wavelength multiplexer/demultiplexer 960 is disposed between the OLT optical transmission line 951 and the ONU optical transmission line 952. The wavelength multiplexer/demultiplexer 960 extracts the excitation light transmitted by the OLT optical transmission line 951 and outputs the extracted excitation light to a terminator 961.
The terminator 961 terminates the acquired excitation light.

CITATION LIST

Non Patent Literature

NPL 1: R. Igarashi et al., "Raman Amplification Based 40 km Reach Raman Amplification Based 40 km Reach the Central Office Building", OECC 2019, TuA 3-3, 2019

SUMMARY OF THE INVENTION

Technical Problem

The excitation light used in distributed Raman amplification has high intensity, and thus there is a possibility that the leaked excitation light entering eyes harms health. Thus, a person who has undergone special training introduces and maintains the system. Unfortunately, the number of facilities to be maintained is enormous, and it is difficult to secure operators who perform maintenance as described above. Thus, there is a need for a method capable of more easily determining safety of a transmission line.
An object of the present disclosure is to provide a light leakage confirmation method, a light leakage confirmation apparatus, and a program capable of more easily determining safety of a transmission line.

Means for Solving the Problem

According to an aspect of the present disclosure, a light leakage confirmation method comprising: an excitation light incident step in which an excitation light output unit connected to a first end of a first optical transmission line outputs an excitation light and makes the excitation light incident on the first optical transmission line; a reflection step in which an excitation light reflection unit connected to a second end of the first optical transmission line reflects the excitation light which has been incident in the excitation light incident step; a reflected light incident step of making a reflected light which has been reflected in the reflection step incident on the first optical transmission line; a reflected light measurement step in which the excitation light output unit measures an intensity of the reflected light; and a leakage determination step of determining whether or not the excitation light is leaked on a basis of the intensity of the excitation light and the intensity of the reflected light which has been measured in the reflected light measurement step.

According to another aspect of the present disclosure, there is provided a light leakage confirmation apparatus connected to a first optical transmission line that shares a partial optical transmission line with a second optical transmission line used in communication between a first optical communication device and a second optical communication device, the light leakage confirmation apparatus comprising: an excitation light incidence unit configured to make an excitation light incident on the first optical transmission line; a reflected light measurement unit configured to measure an intensity of a reflected light of the excitation light received via the first optical transmission line; and a leakage determination unit configured to determine whether or not the excitation light is leaked on a basis of the intensity of the excitation light and the intensity of the reflected light which has been measured by the reflected light measurement unit.

According to still another aspect of the present disclosure, there is provided a program for causing a computer to operate as the light leakage confirmation apparatus.

Effects of the Invention

According to the present disclosure, it is possible to more easily determine safety of a transmission line.

DESCRIPTION OF EMBODIMENTS

Hereinafter, embodiments of the present disclosure will be described in detail with reference to the drawings.

Figure 1:
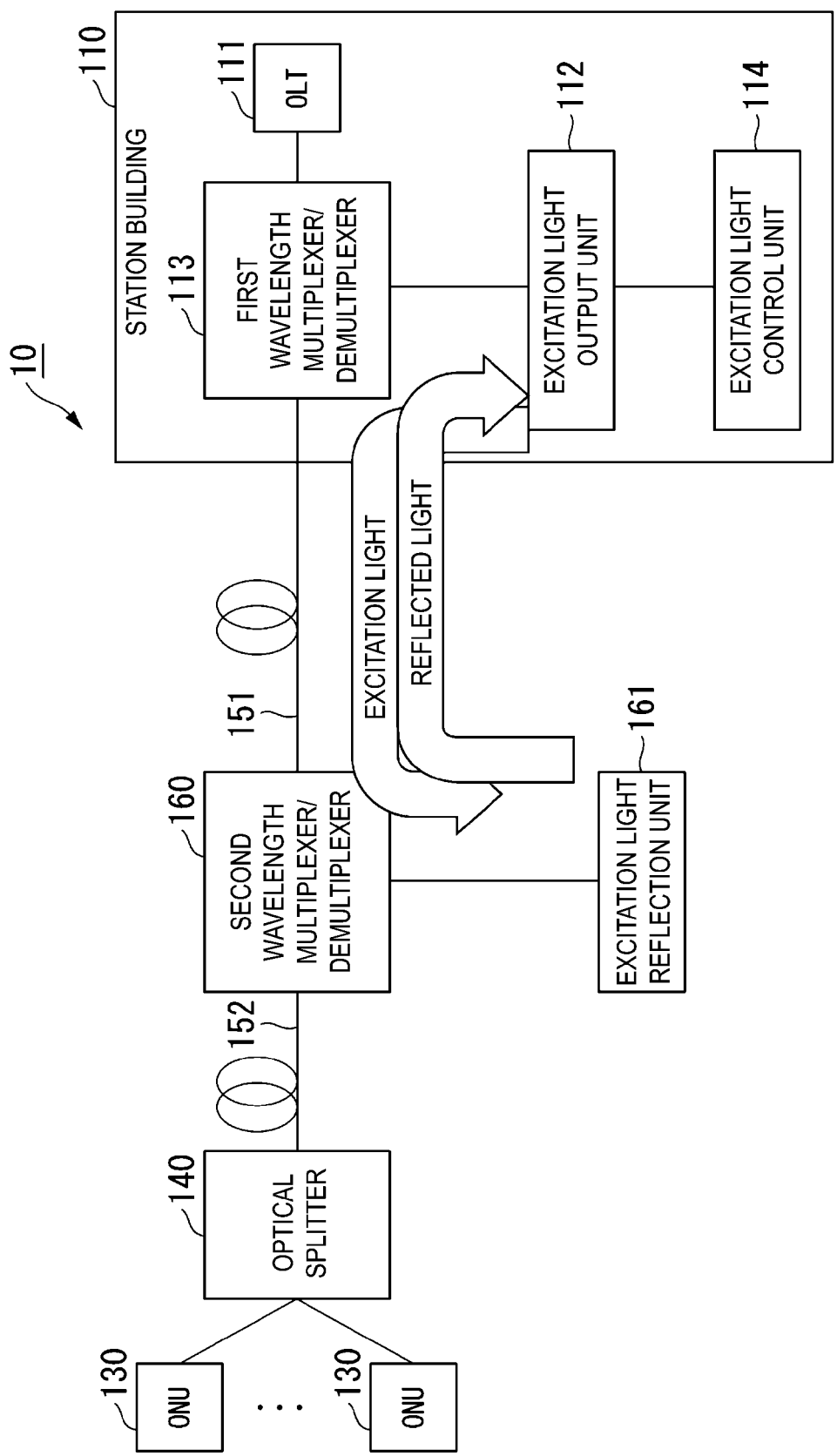
FIG. 1 is a diagram illustrating a configuration of an optical communication system according to a first embodiment.

FIG. 1 is a diagram illustrating a configuration of an optical communication system 10 according to a first embodiment. The optical communication system 10 includes a station building 110, an OLT 111, an excitation light output unit 112, a first wavelength multiplexer/demultiplexer 113, an excitation light control unit 114, an OLT optical transmission line 151, a second wavelength multiplexer/demultiplexer 160, an excitation light reflection unit 161, an ONU optical transmission line 152, an optical splitter 140, and an ONU 130.

Figure 9:
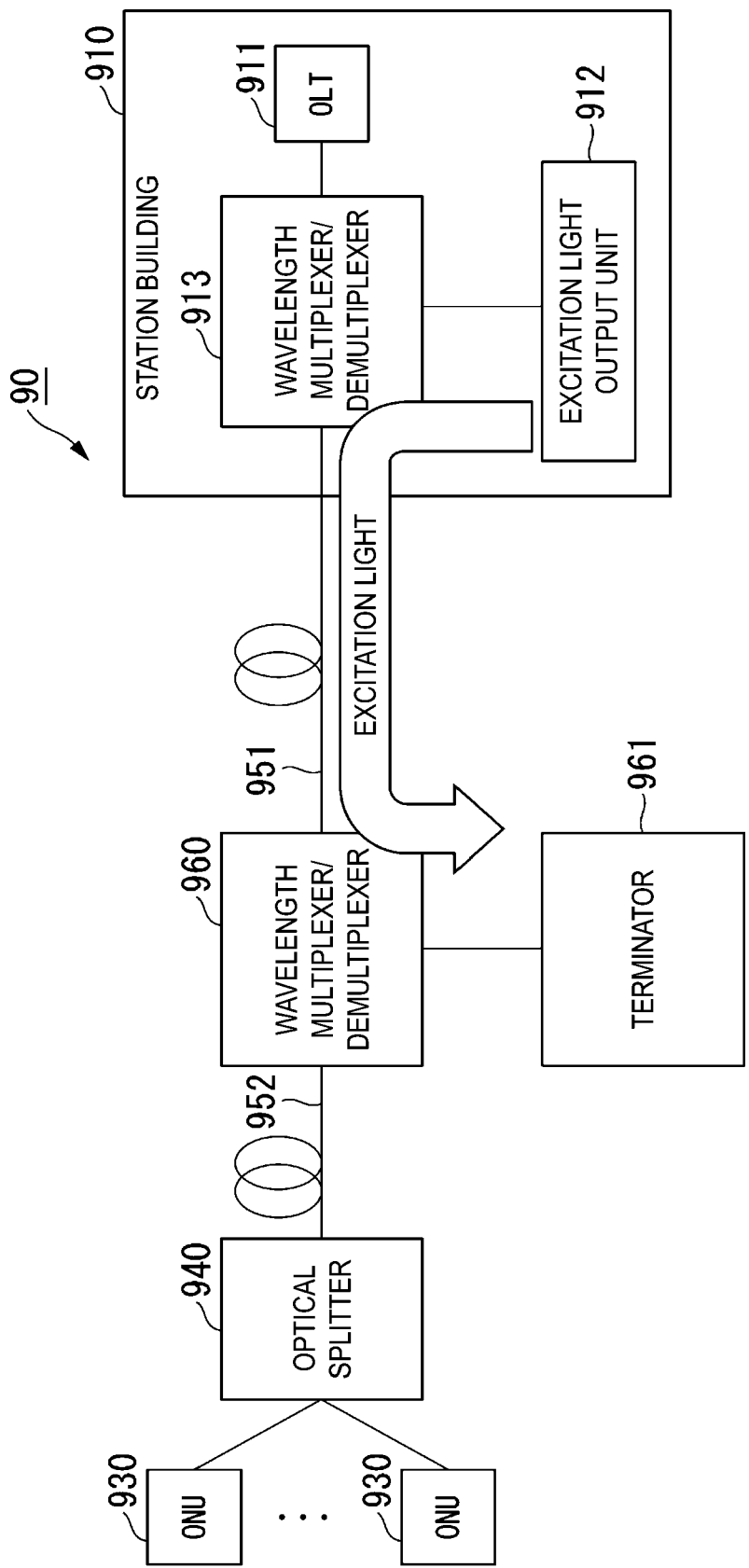
FIG. 9 is a diagram illustrating an example of a configuration of an optical communication system using distributed Raman amplification.

The OLT 111, the first wavelength multiplexer/demultiplexer 113, the OLT optical transmission line 151, the second wavelength multiplexer/demultiplexer 160, the ONU optical transmission line 152, the optical splitter 140, and the ONU 130 in the optical communication system 10 correspond to the OLT 911, the wavelength multiplexer/demultiplexer 913, the OLT optical transmission line 951, the wavelength multiplexer/demultiplexer 960, the ONU optical transmission line 952, the optical splitter 940, and the ONU 930 in the optical communication system 90 illustrated in FIG. 9, respectively.

The excitation light output unit 112 outputs excitation light to the first wavelength multiplexer/demultiplexer 113. The excitation light output unit 112 also detects input light. Further, the excitation light output unit 112 outputs, to the excitation light control unit 114, a setting value of the intensity of the excitation light to be output.

The excitation light control unit 114 acquires the intensity of the excitation light and the intensity of the reflected light from the excitation light output unit 112, and adjusts the intensity of the excitation light based on the acquired excitation light intensity and reflected light intensity.

The excitation light reflection unit 161 reflects light output by the second wavelength multiplexer/demultiplexer 160 toward the second wavelength multiplexer/demultiplexer 160. Examples of the excitation light reflection unit 161 include a mirror.

Figure 2:
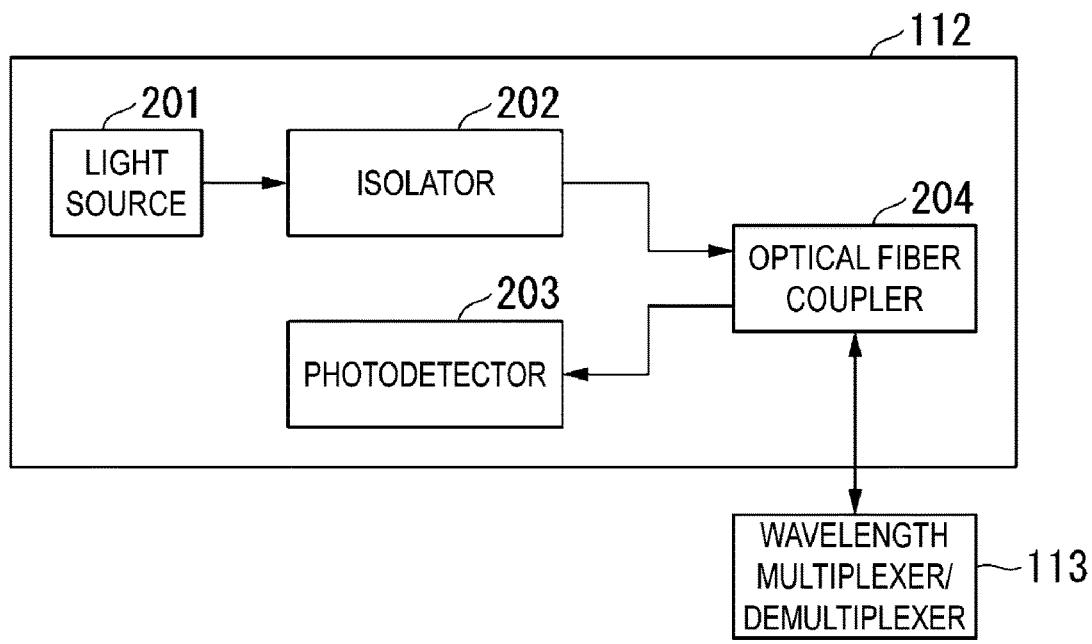
FIG. 2 is a diagram illustrating an example of a configuration of an excitation light output unit according to the first embodiment.

FIG. 2 is a diagram illustrating an example of a configuration of the excitation light output unit 112 according to the first embodiment.

A light source 201 outputs light. Examples of the light source 201 include laser diodes and switches.

An isolator 202 causes the light output by the light source 201 to pass through the isolator and blocks light directed toward the light source 201.

A photodetector 203 detects input light and measures the intensity of the input light. Examples of the photodetector 203 include a photodiode.

An optical fiber coupler 204 is connected to the isolator 202, the photodetector 203, and the first wavelength multiplexer/demultiplexer 113. The optical fiber coupler 204 inputs the light input from the isolator 202 to the first wavelength multiplexer/demultiplexer 113, and inputs the light input from the first wavelength multiplexer/demultiplexer 113 to the photodetector 203. Specifically, the optical fiber coupler 204 is a 2×2 coupler including two ports at a first end and two ports at a second end. One of the two ports at the first end is connected to the first wavelength multiplexer/demultiplexer 113, and the second end is connected to the isolator 202 and the photodetector 203. The port of the optical fiber coupler 204 at the first end, which is not connected to the first wavelength multiplexer/demultiplexer 113, is terminated.

In other embodiments, the excitation light output unit 112 may include a circulator including three ports instead of the optical fiber coupler 204. The circulator is connected to the light source 201, the photodetector 203, and the first wavelength multiplexer/demultiplexer 113 so as to input the light input from the light source 201 to the first wavelength multiplexer/demultiplexer 113 and input the light input from the first wavelength multiplexer/demultiplexer 113 to the photodetector 203.

Figure 3:
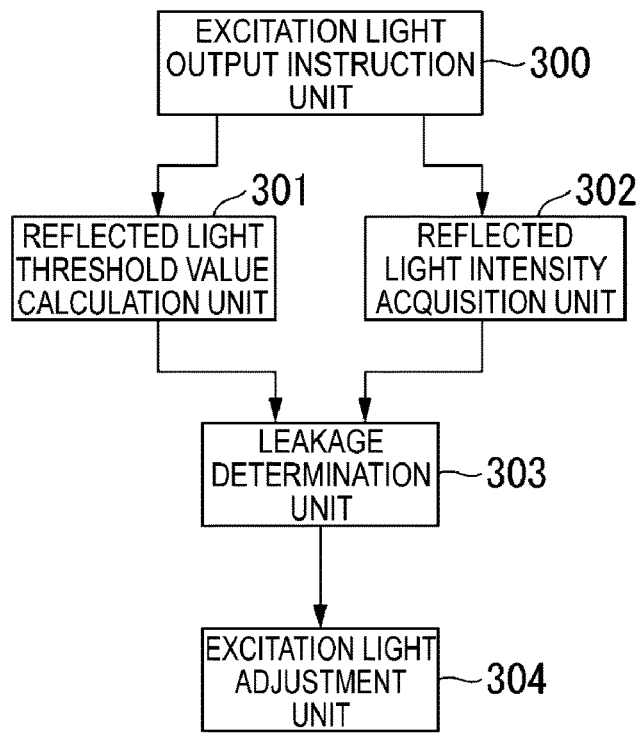
FIG. 3 is a schematic block diagram illustrating a software configuration of an excitation light control unit according to the first embodiment.

FIG. 3 is a schematic block diagram illustrating a software configuration of the excitation light control unit 114 according to the first embodiment.

The excitation light control unit 114 includes an excitation light output instruction unit 300, a reflected light threshold value calculation unit 301, a reflected light intensity acquisition unit 302, a leakage determination unit 303, and an excitation light adjustment unit 304.

The excitation light output instruction unit 300 outputs, to the excitation light output unit 112, an instruction of outputting the excitation light.

The reflected light threshold value calculation unit 301 calculates the reflected light threshold value based on the excitation light intensity acquired by the excitation light output unit 112. As a calculation method, it is conceivable that, for example, when the excitation light intensity is set as I, the reflected light threshold value is calculated as Ix (0<x<1).

The reflected light intensity acquisition unit 302 acquires the intensity value of the reflected light detected by the excitation light output unit 112.

The leakage determination unit 303 determines whether the excitation light is leaked, based on the reflected light threshold value calculated by the reflected light threshold value calculation unit 301 and the measurement value of the reflected light intensity acquired by the reflected light intensity acquisition unit 302.

The excitation light adjustment unit 304 adjusts the excitation light output by the excitation light output unit 112 based on the determination result by the leakage determination unit 303.

Operation of Optical Communication System

Figure 4:
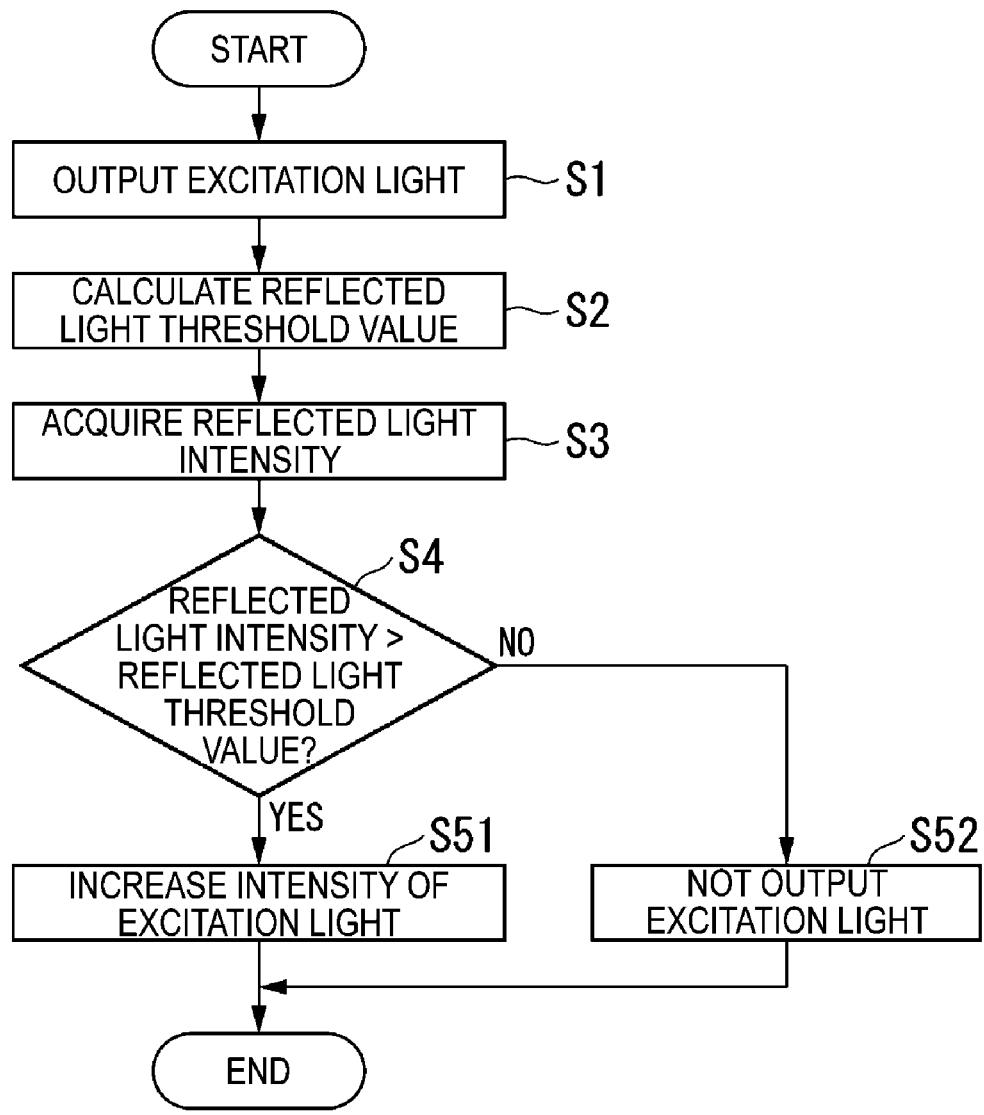
FIG. 4 is a flowchart illustrating an operation of a light leakage determination device according to the first embodiment.

FIG. 4 is a flowchart illustrating an operation of the light leakage determination device according to the first embodiment.

First, the excitation light output instruction unit 300 outputs, to the excitation light output unit 112, an instruction of outputting excitation light. The excitation light output unit 112 acquires the output instruction and outputs the excitation light to the first wavelength multiplexer/demultiplexer 113 (Step S1). At this time, the intensity of the output excitation light is weaker than the intensity of excitation light in a state in which the optical communication system normally operates (hereinafter referred to as a normal state). Thus, even though the excitation light leaks out from the transmission line, and the human body is irradiated with the leaked excitation light, health damage is minimized.

At this time, the reflected light threshold value calculation unit 301 in the excitation light control unit 114 acquires the intensity of the excitation light from the excitation light output unit 112, and calculates the reflected light threshold value (Step S2).

The excitation light output in Step S1 is transmitted through the OLT optical transmission line 151 and is incident on the excitation light reflection unit 161 via the second wavelength multiplexer/demultiplexer 160. Then, the light incident on the excitation light reflection unit 161 is reflected by the excitation light reflection unit 161 toward the second wavelength multiplexer/demultiplexer 160.

The reflected light is incident on the excitation light output unit via the second wavelength multiplexer/demultiplexer 160, the OLT optical transmission line 151, and the first wavelength multiplexer/demultiplexer 113, in a direction opposite to a direction in which the excitation light travels. The excitation light output unit 112 detects the input reflected light and measures the intensity of the reflected light. The reflected light intensity acquisition unit 302 in the excitation light control unit 114 acquires the intensity of the reflected light from the excitation light output unit 112 (Step S3). The leakage determination unit 303 determines whether the excitation light is leaked, based on the reflected light threshold value calculated in Step S2 and the reflected light intensity measured in Step S4 (Step S4). When the reflected light intensity is greater than the reflected light threshold value (Step S4: YES), the leakage determination unit 303 determines that there is no leakage. Then, the excitation light adjustment unit 304 enhances the output of the excitation light and outputs an instruction to the excitation light output unit 112 (Step S51), and then the processing ends. The excitation light output unit 112 increases the intensity of the excitation light up to the intensity in the normal state.

When the reflected light intensity is equal to or smaller than the reflected light threshold value (Step S4: NO), it is understood that the intensity of the excitation light and the intensity of the reflected light are weakened during transmission. In other words, there is a possibility that the light leaks out in the middle of the optical transmission line. At this time, the leakage determination unit 303 determines that the light is leaked. When there is a leakage location in the optical transmission line, the excitation light adjustment unit 304 outputs an instruction to stop the output of the excitation light to the excitation light output unit 112 (Step S62) so that an operator can safely perform maintenance work. Then, the processing ends. Thus, the excitation light output unit 112 stops the output of the excitation light.

Actions and Effects

As described above, according to the first embodiment, in the optical communication system, the excitation light output unit connected to the first end of the optical transmission line can output excitation light and make the excitation light incident on the optical transmission line, the excitation light reflection unit connected to the second end of the optical transmission line can reflect the incident excitation light and make the reflected light again incident on the optical transmission line, the excitation light output unit can measure the intensity of the reflected light and determine whether the excitation light is leaked, based on the intensity of the excitation light and the intensity of the reflected light. It is conceivable that, when leakage occurs in the middle of the optical transmission line, the intensity of the excitation light and the intensity of the reflected light attenuate during transmission, and as a result, the intensity of the reflected light is weakened. This makes it possible to automatically determine the leakage of the excitation light.

Second Embodiment

Figure 5:
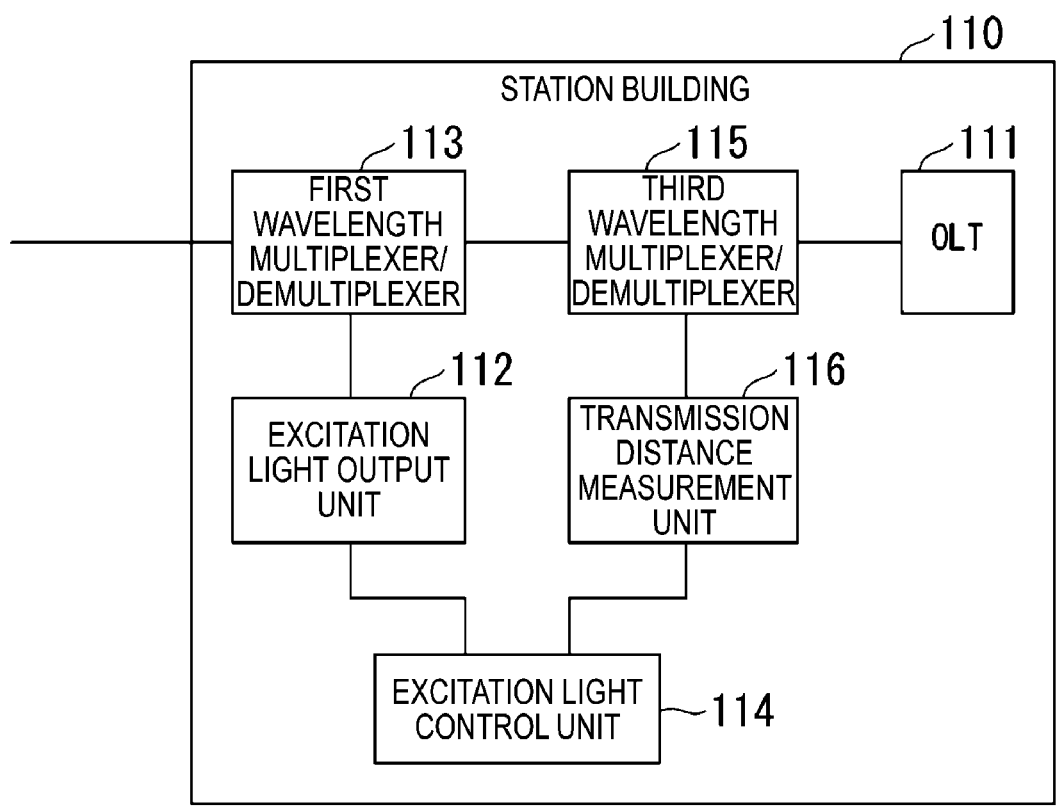
FIG. 5 is a diagram illustrating a configuration of an optical communication system according to a second embodiment.

FIG. 5 is a schematic block diagram illustrating a configuration of an optical communication system 10 according to a second embodiment.

The station building 110 newly includes a third wavelength multiplexer/demultiplexer 115 and a transmission distance measurement unit 116.

The third wavelength multiplexer/demultiplexer unit 115 multiplexes light output by the transmission distance measurement unit 116 and an optical signal output by the OLT 111, and outputs the resultant light to the first wavelength multiplexer/demultiplexer 113. Further, the third wavelength multiplexer/demultiplexer unit 115 demultiplexes light acquired from the first wavelength multiplexer/demultiplexer 113 into rays of light in the wavelength band of the light output by transmission distance measurement unit 116 and the wavelength band of the optical signal. Then, the third wavelength multiplexer/demultiplexer unit 115 outputs the respective rays of light to the transmission distance measurement unit 116 and the OLT 111.

The transmission distance measurement unit 116 measures the distance of the OLT optical transmission line 151 in which amplification by excitation light is performed. Examples of the transmission distance measurement unit 116 include an optical time-domain reflectometer (OTDR). When the transmission distance measurement unit 116 is configured by the OTDR, the transmission distance measurement unit 116 outputs an optical pulse to the third wavelength multiplexer/demultiplexer 115. The wavelength of the optical pulse is different from all the wavelengths of the excitation light and the optical signal. The transmission distance measurement unit 116 acquires scattered light or reflected light of the optical pulse, and measures the distance of the optical transmission line based on the time series of received light intensity starting from an output timing of the optical pulse.

The excitation light control unit 114 acquires the intensity of the excitation light and the intensity of the reflected light from the excitation light output unit 112, and acquires the distance of the optical transmission line from the transmission distance measurement unit 116. The excitation light control unit 114 adjusts the intensity of the excitation light based on the acquired distance of the optical transmission line, excitation light intensity, and reflected light intensity. The optical communication system 10 according to the second embodiment is similar to the optical communication system 10 according to the first embodiment except for software configurations of the third wavelength multiplexer/demultiplexer 115, the transmission distance measurement unit 116, and the excitation light control unit 114.

Figure 6:
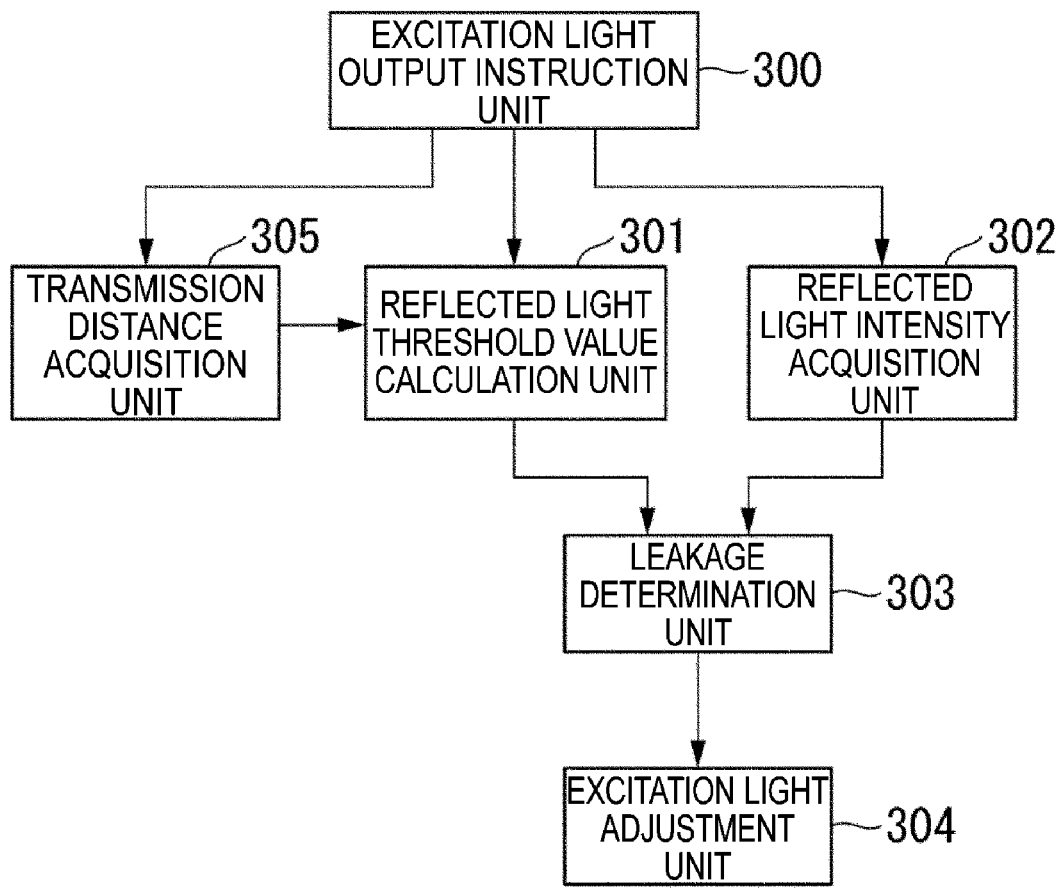
FIG. 6 is a schematic block diagram illustrating a software configuration of an excitation light control unit according to the second embodiment.

FIG. 6 is a schematic block diagram illustrating the software configuration of the excitation light control unit 114 according to the second embodiment.

A measurement distance acquisition unit 305 acquires the distance of the optical transmission line from the transmission distance measurement unit 116.

The reflected light threshold value calculation unit 301 calculates the reflected light threshold value based on the excitation light intensity acquired by the excitation light output unit 112 and the transmission distance acquired by the measurement distance acquisition unit 305. The intensity of light attenuates while the light is transmitted in the optical transmission line. Thus, it is preferable to consider the attenuation caused by the optical transmission line to determine whether the leakage occurs from the intensity of the reflected light. Examples of a conceivable method of calculating the reflected light threshold value include a method of calculating the reflected light threshold value by Expression (1) in consideration of the attenuation by the optical transmission line, where the excitation light intensity is I [w], the transmission distance is y [m], the loss per meter of the optical transmission line is α (<0) [dB/m], and an excessive loss at a connection point is x (0<x<1).

[Math. 1]

$$Ix \times 10^{\frac{\alpha y}{10}} \quad (1)$$

The excitation light control unit 114 according to the second embodiment is similar to the excitation light control unit 114 according to the first embodiment except for the measurement distance acquisition unit 305 and the reflected light threshold value calculation unit 301.

Figure 7:
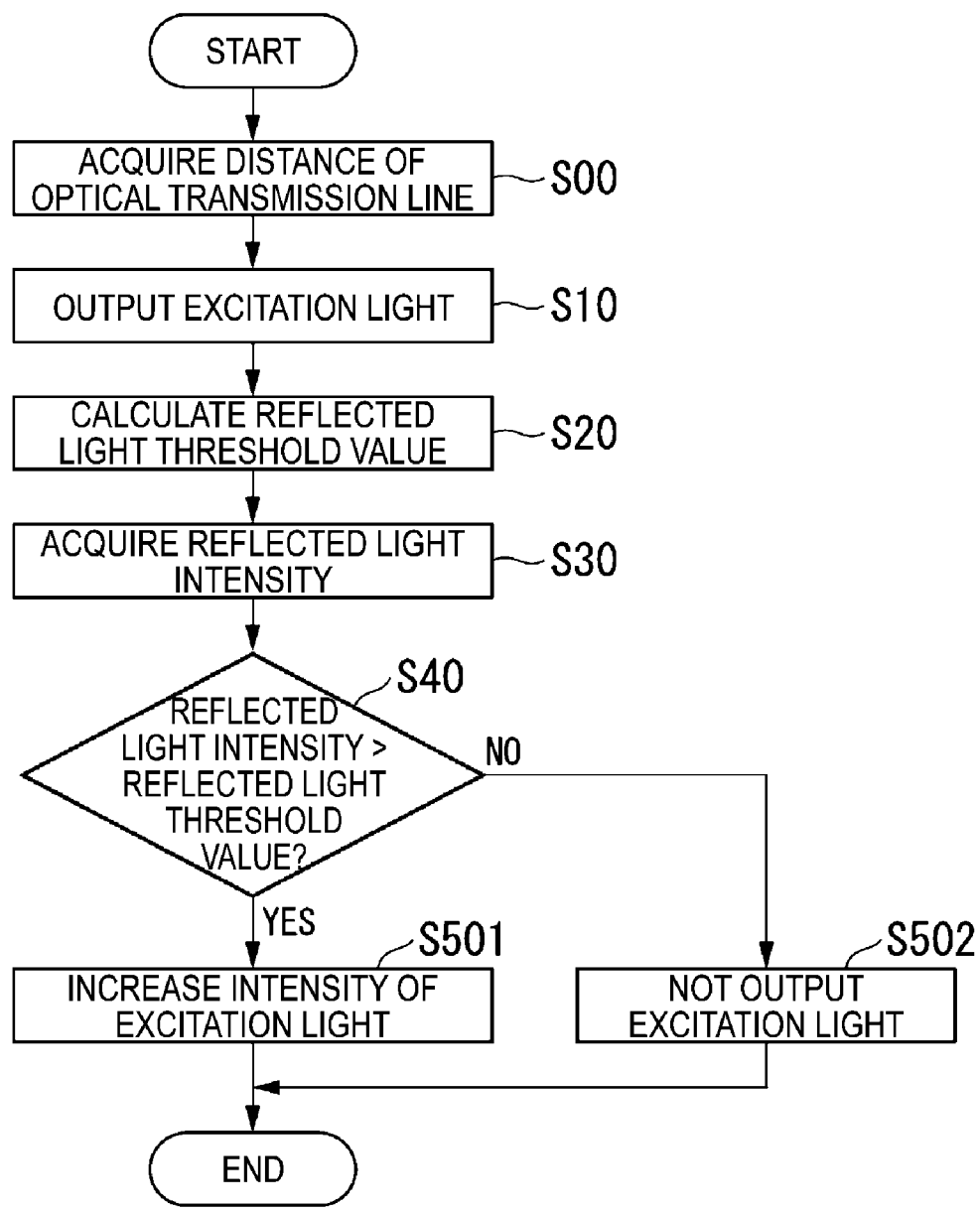
FIG. 7 is a flowchart illustrating an operation of a light leakage determination device according to the second embodiment.
Figure 8:
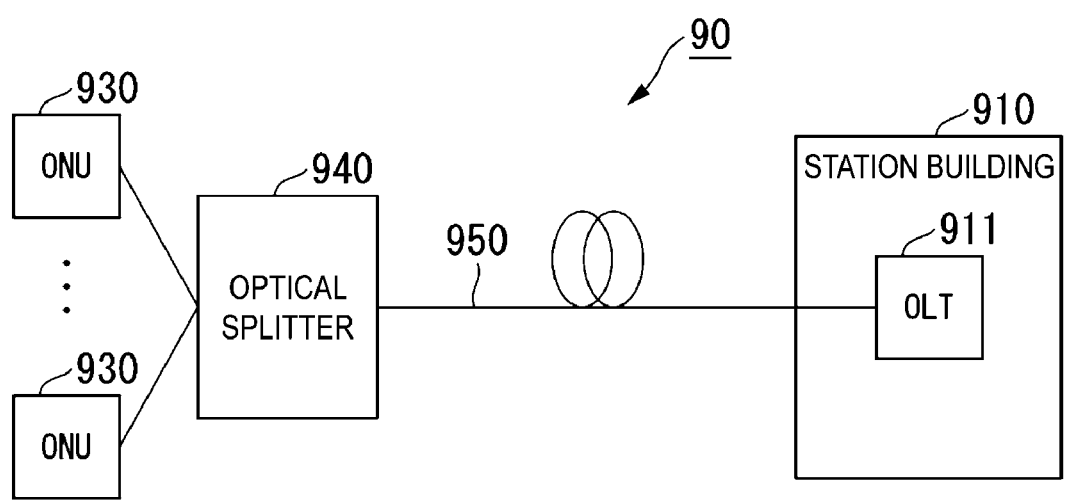
FIG. 8 is a diagram illustrating an example of a configuration of an optical communication system into which a PON system is adopted.

FIG. 7 is a flowchart illustrating an operation of a light leakage determination device according to the second embodiment.

First, the transmission distance measurement unit 116 measures the distance of the OLT optical transmission line 151. Then, the transmission distance measurement unit 116 outputs data of the measured transmission distance to the excitation light control unit 114, and the measurement distance acquisition unit 305 acquires the data of the transmission distance (Step S00). The excitation light output instruction unit 300 outputs, to the excitation light output unit 112, an instruction of outputting excitation light. The excitation light output unit 112 acquires the output instruction and outputs the excitation light to the first wavelength multiplexer/demultiplexer 113 (Step S10). The reflected light threshold value calculation unit 301 acquires the intensity of the excitation light from the excitation light output unit 112. Then, the reflected light threshold value calculation unit 301 calculates the reflected light threshold value based on the distance of the OLT optical transmission line 151, which is acquired by the measurement distance acquisition unit 305, and the intensity of the excitation light, which is acquired by the excitation light output unit 112 (Step S20). The excitation light output in Step S10 is transmitted through the OLT optical transmission line 151 and is made incident on the excitation light reflection unit 161 via the second wavelength multiplexer/demultiplexer 160. Then, the light incident on the excitation light reflection unit 161 is reflected by the excitation light reflection unit 161 toward the second wavelength multiplexer/demultiplexer 160.

The reflected light is made incident on the excitation light output unit via the second wavelength multiplexer/demultiplexer 160, the OLT optical transmission line 151, and the first wavelength multiplexer/demultiplexer 113, in an opposite direction of a direction in which the excitation light travels. The excitation light output unit 112 detects the input reflected light and measures the intensity of the reflected light. The, the reflected light intensity acquisition unit 302 in the excitation light control unit 114 acquires the intensity of the reflected light from the excitation light output unit 112 (Step S30). The leakage determination unit 303 determines whether the excitation light is leaked, based on the reflected light threshold value calculated in Step S20 and the reflected light intensity measured in Step S30 (Step S40). When the reflected light intensity is greater than the reflected light threshold value (Step S40: YES), the leakage determination unit 303 determines that there is no leakage. The leakage determination unit 303 outputs information indicating no leakage to the excitation light adjustment unit 304, and the excitation light adjustment unit 304 enhances the output of the excitation light (Step S501), and then the processing ends.

When the reflected light intensity is equal to or smaller than the reflected light threshold value (Step S40: NO), this means the intensity of the excitation light and the intensity of the reflected light are weakened during transmission. Thus, there is a possibility that the light is leaked in the middle of the optical transmission line. At this time, the leakage determination unit 303 determines that the light is leaked. The excitation light adjustment unit 304 outputs, to the excitation light output unit 112, an instruction to stop the output of the excitation light (Step S502), and then the processing ends.

Actions and Effects

As described above, according to the second embodiment, the optical communication system further includes the transmission distance measurement unit that measures the distance of the optical transmission line, and the leakage determination unit performs a determination based on the distance of the optical transmission line, which is measured by the distance measurement unit. Thus, when the threshold value of the reflected light is calculated, the distance of the optical transmission line is considered in addition to the intensity of the excitation light. Thus, it is possible to more accurately determine whether the excitation light is leaked, as compared with the first embodiment.

Other Embodiments

Hitherto, the embodiments of the present disclosure have been described in detail with reference to the drawings, but the specific configuration is not limited to the above description, and various design changes and the like can be made in a range without departing from the gist of the present disclosure.

The reflected light threshold value calculation unit 301 according to the first embodiment calculates the reflected light threshold value by acquiring the setting value of the excitation light intensity output by the excitation light output unit, but the present disclosure is not limited thereto. For example, the excitation light output unit may include a photometer, and may obtain the excitation light intensity by the photometer measuring the output excitation light.

In the excitation light control unit 114 according to the first embodiment, the excitation light adjustment unit 304 uses the determination result of the leakage determination unit 303 to control the excitation light, but the present disclosure is not limited thereto. For example, the leakage determination unit 303 may output the determination result to a presentation device such as an external display, and the presentation device may present the determination result. Thus, it is possible to inform a maintenance person or a user of the optical communication system of whether leakage occurs.

The distance of the optical transmission line, which is acquired by the measurement distance acquisition unit 305 according to the second embodiment, may not necessarily be measured by the transmission distance measurement unit 116. For example, in a case where the distance of the optical transmission line is known before performing the operation, a database may store the distance data, and the reflected light threshold value calculation unit 301 may acquire the distance of the optical transmission line from the database.

The light leakage checking (confirmation) device (apparatus) includes a central processing unit (CPU), a memory, an auxiliary storage device, and the like connected to each other by a bus and, by executing a program, functions as a device that includes the excitation light output instruction unit, the reflected light threshold value calculation unit, the reflected light intensity acquisition unit, the leakage determination unit, and the excitation light adjustment unit. All or some functions of the light leakage checking device may be implemented using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, or a CD-ROM, or a storage device such as a hard disk incorporated in a computer system. The program may be transmitted via an electrical communication line.

REFERENCE SIGNS LIST

10, 90: Optical communication system
110, 910: Station building
111, 911: OLT
112, 912: Excitation light output unit
113: First wavelength multiplexer/demultiplexer
114: Excitation light control unit
115: Third wavelength multiplexer/demultiplexer
116: Transmission distance measurement unit
130, 930: ONU
140, 940: Optical splitter
151, 951: OLT optical transmission line
152, 952: ONU optical transmission line
160: Second wavelength multiplexer/demultiplexer
161: Excitation light reflection unit
201: Light source
202: Isolator
203: Photodetector
204: Optical fiber coupler
300: Excitation light output instruction unit
301: Reflected light threshold value calculation unit
302: Reflected light intensity acquisition unit
303: Leakage determination unit
304: Excitation light adjustment unit
305: Measurement distance acquisition unit
913, 960: Wavelength multiplexer/demultiplexer
961: Terminator

The invention claimed is:

1. A light leakage confirmation method comprising:
outputting, by an excitation light output unit connected to a first end of a first optical transmission line, an excitation light and making the excitation light incident on the first optical transmission line;
reflecting, by a mirrorconnected to a second end of the first optical transmission line, the excitation light which has been incident on the first optical transmission line;
making a reflected light which has been reflected in the step of reflecting incident on the first optical transmission line;
measuring, by the excitation light output unit, an intensity of the reflected light;
determining, when the reflected light intensity is greater than a threshold value of the reflected light which is calculated based on an intensity of the excitation light, that the excitation light is not leaked, and determining, when the reflected light intensity is equal to or smaller than the threshold value, that the excitation light is leaked; and
enhancing, when the excitation light is determined not to be leaked, the excitation light and stopping, when the excitation light is determined to be leaked, the output of the excitation light.

2. The light leakage confirmation method according to claim 1, wherein a determination in the step of determining is performed on a basis of a distance of the first optical transmission line.

3. The light leakage confirmation method according to claim 2, further comprising:
measuring the distance of the first optical transmission line, wherein
the determination in the step of the determining is performed on the basis of the distance of the first optical transmission line which has been measured in the step of measuring the distance of the first optical transmission line.

4. The light leakage confirmation method according to claim 1, wherein
the first optical transmission line shares a partial optical transmission line with a second optical transmission line used for a first optical communication device and at least one a second optical communication device to transmit and receive an optical signal.

5. The light leakage confirmation method according to claim 4, wherein a wavelength multiplexer/demultiplexer is disposed among the second optical transmission line, and
the wavelength multiplexer/demultiplexer outputs the excitation light to the mirror.

6. The light leakage confirmation method according to claim 5,
wherein the at least one second optical communication device include a plurality of second optical communication devices,
an optical splitter is disposed between the wavelength multiplexer/demultiplexer and the plurality of second optical communication devices, and
each of the plurality of second optical communication devices transmits and receives the optical signal via the optical splitter.

7. The light leakage confirmation method according to claim 1, wherein determining whether or not the excitation light is leaked in the middle of the first optical transmission line.

8. The light leakage confirmation method according to claim 1, further comprising:
calculating the threshold value of the reflected light based on the intensity of the excitation light.

9. A light leakage confirmation apparatus connected to a first optical transmission line that shares a partial optical transmission line with a second optical transmission line used in communication between a first optical communication device and at least one a second optical communication device, the light leakage confirmation apparatus comprising a processor and a memory having computer program instructions stored thereon, wherein the computer program instructions, when executed by the processor, perform to:
make an excitation light incident on the first optical transmission line;
measure an intensity of a reflected light of the excitation light received via the first optical transmission line; the reflected light is the excitation light reflected by a mirror connected to a second end of the first transmission line,
determine, when the reflected light intensity is greater than a threshold value of the reflected light which is calculated based on an intensity of the excitation light, that the excitation light is not leaked, and determining, when the reflected light intensity is equal to or smaller than the threshold value, that the excitation light is leaked, and
enhance, when the excitation light is determined not to be leaked, the excitation light and stop, when the excitation light is determined to be leaked, the output of the excitation light.

10. The light leakage confirmation apparatus according to claim 9, the computer program instructions further perform to:
measure a distance of the first optical transmission line, and determine whether or not the excitation light is leaked on a basis of the distance of the first optical transmission line which has been measured.

11. The light leakage confirmation apparatus according to claim 9, wherein a wavelength multiplexer/demultiplexer is disposed among the second optical transmission line, and
the wavelength multiplexer/demultiplexer outputs the excitation light to the mirror.

12. The light leakage confirmation apparatus according to claim 11,
wherein the at least one second optical communication device include a plurality of second optical communication devices,
a optical splitter is disposed between the wavelength multiplexer/demultiplexer and the plurality of second optical communication devices, and
each of the plurality of second optical communication devices transmits and receives the optical signal via the optical splitter.

13. A non-transitory computer-readable medium storing a computer program for causing a computer to execute steps comprising
outputting, by an excitation light output unit connected to a first end of the first optical transmission line, an excitation light and making the excitation light incident on a first optical transmission line;
reflecting, by a mirror connected to a second end of the first optical transmission line, the excitation light which has been incident on the first optical transmission line;
making a reflected light which has been reflected in the step of reflecting incident on the first optical transmission line;
measuring, by the excitation light output unit, an intensity of the reflected light;
determining, when the reflected light intensity is greater than a threshold value of the reflected light which is calculated based on an intensity of the excitation light, that the excitation light is not leaked, and determining, when the reflected light intensity is equal to or smaller than the threshold value, that the excitation light is leaked; and
enhancing, when the excitation light is determined not to be leaked, the excitation light and stopping, when the excitation light is determined to be leaked, the output of the excitation light.

* * * * *